Jan. 27, 1970     R. F. OBERGEFELL ET AL     3,491,855

OIL MIST LUBRICATING SYSTEM

Filed July 17, 1968

INVENTORS
Ronald F. Obergefell
Geza A. Thiry

BY Hill, Sherman, Meroni, Gross & Simpson ATTORNEYS

INVENTORS
Ronald F. Obergefell
Geza A. Thiry

United States Patent Office 3,491,855
Patented Jan. 27, 1970

3,491,855
OIL MIST LUBRICATING SYSTEM
Ronald F. Obergefell, Richmond Heights, and Geza A. Thiry, Lakewood, Ohio, assignors to Houdaille Industries, Inc., Buffalo, N.Y., a corporation of Delaware
Filed July 17, 1968, Ser. No. 745,546
Int. Cl. F01m 1/08, 1/00; F16n 5/00
U.S. Cl. 184—55
16 Claims

ABSTRACT OF THE DISCLOSURE

An oil mist lubricating system including an oil mist generating head having an air-oil admixing chamber of the venturi-type, and oil reservoir and an oil lift tube connecting the reservoir with the oil mist generating head. A heater maintains the oil in the reservoir at a temperature only slightly above the aerolization point of the oil and below the chemical decomposition point thereof and the oil lift tube and portions of the generating head are constituted of material having low thermal conductivity properties for maintaining the temperature of the oil as it enters the admixing chamber above the aerolization point.

Background of the invention

This invention relates generally to lubricating systems and more particularly to a method of and apparatus for generating an oil mist utilizing highly viscous mistable lubricants.

Centralized lubrication systems employing an oil mist are known in the prior art. In such systems an oil mist or aerosol is generated at a central location and carried through conduits to multiple points of use such as bearings. Fittings are generally employed at the bearings for supplying the bearings with an oil mist or spray or with the lubricant in liquid form.

The oil mist or aerosol is generated in the admixing chamber of an air-operated venturi formed in an oil mist generating head in which minute particles of the oil are admixed with air. Generally the oil is drawn into the admixing chamber by the vacuum condition caused by the air passing through the throat of the venturi.

In general the commercial exploitation of oil mist lubrication systems has been limited to the use of oils in the lower viscosity ranges. Thus there has been little application of oil mist systems utilizing oil or other mistable lubricants having viscosities upwards of about 1000 Saybolt Universal Seconds at 100° F. Although the use of more viscous oils is desirable significant difficulties have been encountered in generating commercially acceptable quantities of mist with the more viscous oils.

The reduction in mist-generating capabilities of oil mist lubricating systems in the higher ranges of oil viscosity results from the necessity of maintaining the temperature of the oil as it enters the admixing chamber at a level at which it is susceptible of dividing into the minute particles required in an oil mist system. The lower the viscosity of the oil the lower its aerolization point, that is, the temperature at which the oil will combine with air in the fine particles necessary to produce an aerosol. As the viscosity of the oil increases so does the aerolization point.

In the past attempts have been made to utilize more highly viscous oils, oils having a viscosity as high as or higher than 1000 S.U.S. at 100° F., merely by raising the temperature of the oil in the oil reservoir. This practice has not been completely satisfactory since it has been determined that the oil in the reservoir must be raised to a temperature substantially above the aerolization point in order to produce an oil mist Because of this higher temperature of the oil the oil heaters often times subject the oil immediately adjacent thereto to temperatures above the chemical decomposition point, rendering the oil unsuitable for lubrication purposes.

In order to overcome the problem of excessive heating in the oil reservoir it has been proposed to reduce the temperature in the reservoir to a level below the aerolization point but to heat the pressurized air, before it enters the admixing chamber, to a level at which the air itself is capable of increasing the temperature of the oil above the aerolization point as the air mixes with the oil in the admixing chamber. This practice, of course, generally requires substantial heating of the air above ambient air temperature.

The present invention is based in part on the discovery that the cooling effect of the oil mist itself on the oil lift tube, which conveys the oil from the reservoir to the oil mist generating head, and the cooling effect of the air as it expands in the throat of the venturi of the mist generating head, significantly reduces the temperature of the oil before the oil enters the admixing chamber. It is this cooling effect which apparently has necessitated either overheating of the oil in the reservoir (raising the temperature of the oil substantially above the aerolization point) or substantial heating of the air before it enters the admixing chamber. Applicants have discovered that by providing materials having suitable insulation properties in the conduit members which convey the oil from the oil reservoir to the admixing chamber, the reservoir temperature can be maintained only slightly above the aerolization point of the oil and the incoming pressurized air temperature can be maintained at ambient levels while maintaining the temperature of the oil as it enters the admixing chamber above the aerolization point.

Summary of the invention

In light of the foregoing the present invention may be summarized as comprising a method of and apparatus for generating an aerosol with lubricating oils having higher viscosities by directing a stream of pressurized air to a venturi-type oil mist generating head, heating a reservoir of lubricating oil to a temperature only slightly above the aerolization point and substantially below chemical decomposition point of the oil, communicating the oil in the reservoir with the throat of the venturi in the generating head to draw the oil in a stream from the reservoir into admixing relation with the air within the venturi, and insulating the stream of oil so that the temperature thereof is maintained above the aerolization point as it admixes with the air to produce an aerosol.

One aspect of the invention resides in the utilization of material having low thermal conductivity as the conduit for conveying the oil from the reservoir to the admixing chamber. The temperature drop of the oil as it is conveyed from the reservoir to the admixing chamber is thereby substantially reduced, and the oil in the reservoir therefore need be raised to a temperature only slightly above the aerolization point. Excessive heating and "hot spots" immediately surrounding the oil reservoir heaters are therefore avoided.

Another aspect of the invention resides in the provision of an air heater to raise the temperature of the pressurized air entering the admixing chamber to a level only slightly above maximum anticipated ambient air temperature. By maintaining the incoming pressurized air temperature at a constant air density can be maintained at the admixing chamber for a given air pressure and the quantity or flow rate of generated oil mist can be carefully controlled.

It is, therefore, an object of the present invention to provide an improved method of and apparatus for generating an oil mist for centralized lubrication system using the more highly viscous oils.

Another object is to reduce the required temperature of the oil in the oil reservoir.

Another object is to avoid the deleterious cooling effect of the generated oil mist and of the expanding air on the oil in terms of reduction in oil temperature.

Another object is to maintain a more constant oil mist output by maintaining the temperature of the incoming pressurized air at a constant value.

Many other features, advantages and additional objects of the present invention will become manifest to those versed in the art upon making reference to the detailed description which follows and the accompanying sheets of drawing in which preferred structural embodiments incorporating the principles of the present invention are shown by way of illustrative example only.

Description of the preferred embodiment

Figure 1:
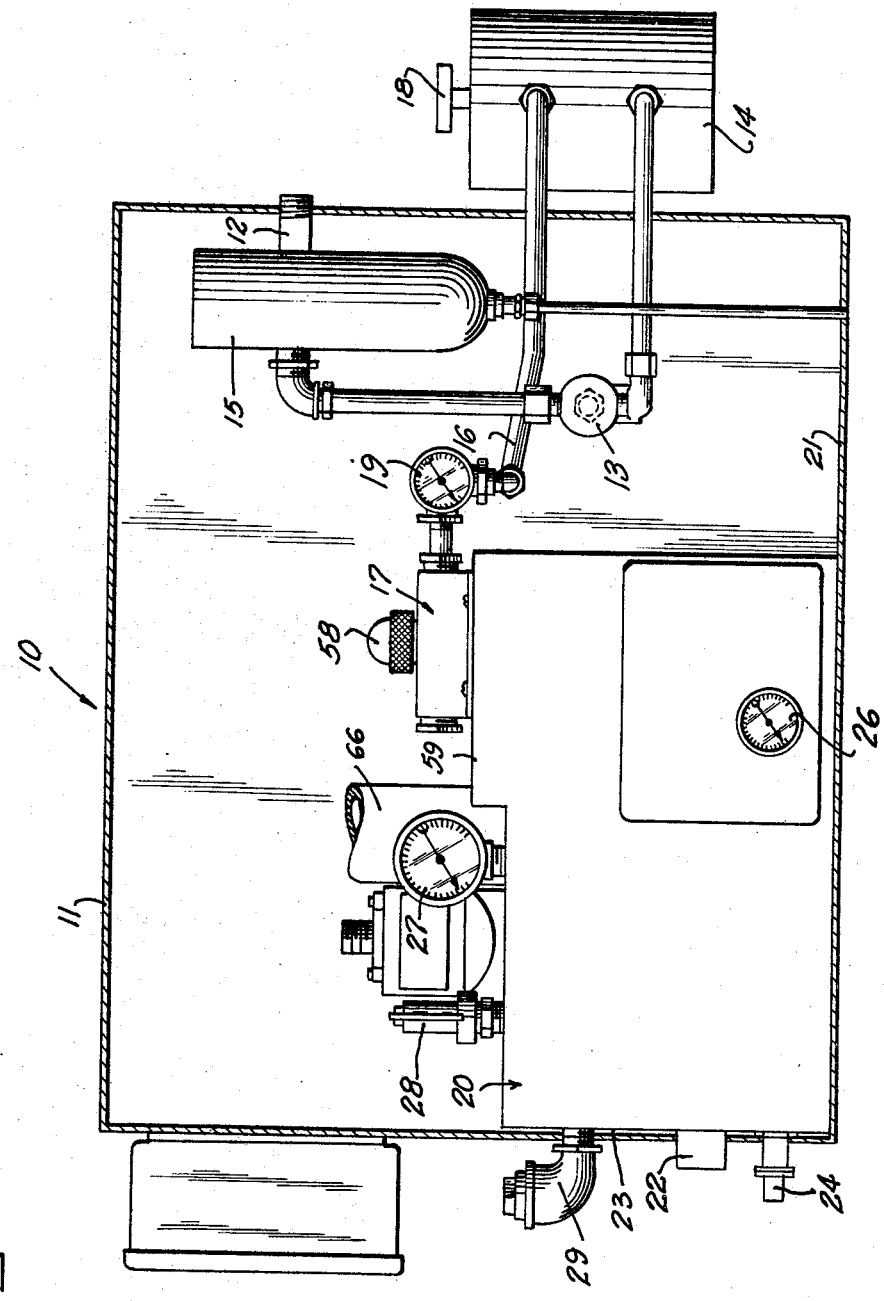
FIGURE 1 is a side elevational view of an oil mist generating system constructed in accordance with the principles of the present invention.

Referring to FIGURE 1, an oil mist generator for use in a centralized lubrication system is indicated generally at reference numeral 10 and comprises a frame 11 on which various components of the generator 10 are assembled. The air side of the generator 10 comprises a pipe 12 adapted for connection to a source of pressurized air such as an air compressor. An air solenoid valve 13 is mounted in the pipe 12 to automatically shut off the supply of air when the generator 10 is not being used.

The pressurized air is directed through an air heater 14 and a filter 15 and thence through a pipe 16 to an air inlet of an oil mist generating head indicated generally at reference numeral 17.

The air heater 14 is controlled by means of a suitable thermostat 18 to maintain the temperature of air to the generating head 17 at a constant value, thus ensuring a constant flow rate of air for any given air pressure. To this end the thermostat 18 is adjusted to maintain the air temperature at a level slightly above the maximum anticipated ambient temperature, thus assuring a constant flow rate of air regardless of variations in ambient air temperature. This of course has the salutary effect of tending to maintain a constant flow rate of generated oil mist for a given viscosity of oil. A thermometer 19 may be placed in the pipe 16 to provide a visual check of air temperature.

The oil side of the generator 10 comprises an oil reservoir 20 mounted on a floor plate 21 of the frame 11. An oil heater 22 is mounted on a side wall 23 of the reservoir 20 and is regulated by an oil heater thermostatic control 24 also mounted on side wall 23 and operatively connected to the oil heater 22.

The thermostatic control 24 is adjusted to maintain the temperature of the oil within the reservoir 20 at a temperature only slightly above the aerolization point of the oil, which aerolization point or temperature varies as a function of oil viscosity. For example, in using lighter oils having lower viscosities the thermostatic control 24 may be adjusted to a lower temperature, whereas with heavier oils having higher viscosities the thermostatic control 24 is adjusted to a higher temperature since the aerolization point of the more viscous oils is higher.

An oil thermometer 26 may be mounted on the reservoir 20 to provide a visual check of oil temperature and a water column gage or similar device as at 27 may be used to indicate pressure within the reservoir. A relief valve 28 may also be mounted on the reservoir 20 as a precautionary measure. In addition the reservoir is provided with an oil fill coupling 29 for filling the reservoir.

Figure 2:
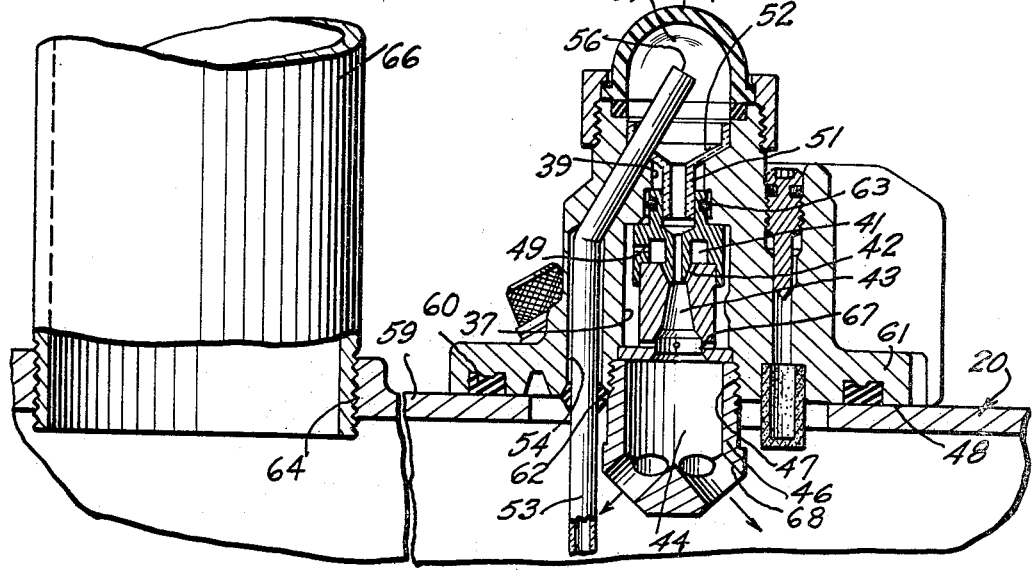
FIGURE 2 is an enlarged vertical sectional view of the oil mist generating head and oil mist outlet of the generating system shown in FIGURE 1.
Figure 3:
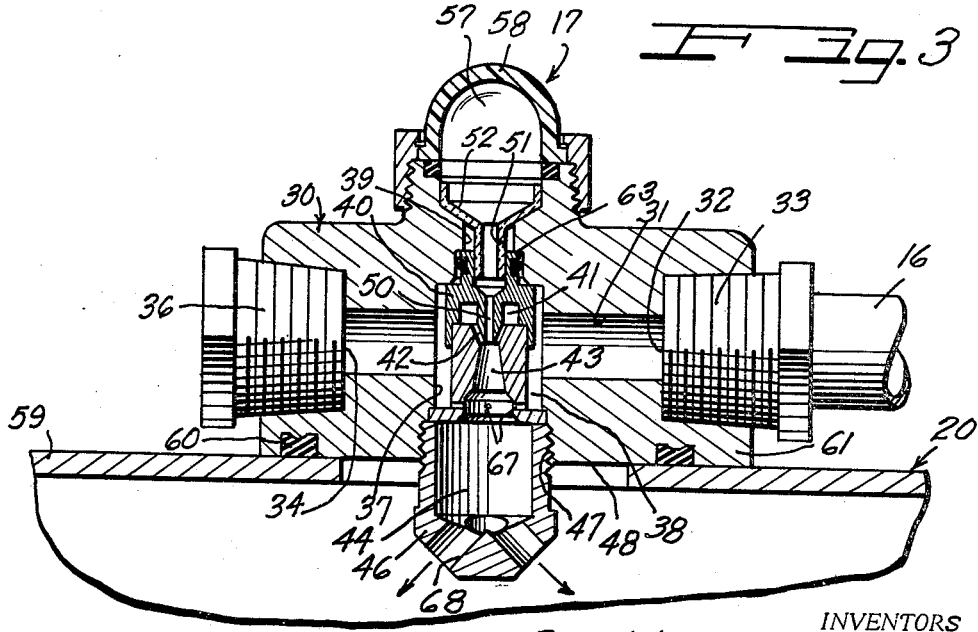
FIGURE 3 is similar to FIGURE 2 but shows a vertical sectional view of the oil mist generating head substantially at right angles to the sectional view shown in FIGURE 2.

Referring to FIGURES 2 and 3, the oil mist generating head 17 may be more particularly characterized as comprising a body 30 in which is formed a horizontal bore 31. One end 32 of the bore 31 comprises a pressurized air inlet and receives a threaded end 33 of the air inlet pipe 16. An opposite end 34 of the bore 31 is closed by means of a threaded plug or the like at 36.

Also formed in the body 30 is a vertical bore 37 which intersects the horizontal bore 31 and which comprises an enlarged diameter portion 38 and a reduced portion 39. Housed within the enlarged portion 38 is a venturi plug 40 in which is formed an annular inner chamber 41, a narrow conically shaped venturi throat 42 and a frusto-conically shaped expansion or admixing chamber 43. The smaller end of the admixing chamber 43 communicates with the throat 42 while the larger end communicates with an oil mist chamber 44 formed in a nipple 46 which is threaded into a bore 47 opening into a bottom wall 48 of the body 30.

The pressurized air which enters the oil mist generating head 17 through the tube 16 surrounds the venturi plug 40 in the enlarged diameter chamber 38 and passes to the annular chamber 41 through a series of angularly spaced apertures 49 formed in the plug 40. It will be appreciated that as the air flows from the annular chamber 41 through the throat 42 and into the expanding or admixing chamber 43, the pressure thereof in the admixing chamber 43 is reduced.

Also formed in the venturi plug 40 is a vertically extending oil passageway 50 which communicates at a lower end with the admixing chamber 43, and which communicates at an upper end with a hollow sleeve 51 of an oil funnel member 52. An oil lift tube 53 shown in FIGURE 2 terminates at its lower end below the level of oil in the reservoir 20 and extends up through a vertical bore 54 formed in the generating head 17 to terminate at an upper end 56 within a hollow 57 of a dome or cap member 58 and in spaced above relation with respect to the oil funnel 52.

The oil mist generating head 17 is mounted on a top wall 59 of the oil reservoir 20 and is secured thereto by suitable fasteners such as threaded bolts. Suitable gasketing material as indicated as 60 is provided between the top wall 59 and a mating flange 61 of the generating head 17 in order to enure an oil air seal therebetween, and additional gasketing material as indicated as reference numerals 62 and 63 is provided for sealing purposes.

In order to direct the generated oil mist from the reservoir 20 a bore 64 is formed in the top wall 59 thereof adjacent the oil mist generating head 17 and an oil mist outlet conduit 66 is threaded therein for transmitting the oil mist to various branch lines and thence to the various points of use such as sleeve bearings or the like lubrication points.

In operation the high pressure air passing through the venturi throat 42 into the expanding chamber 43 causes a reduced pressure condition in chamber 43 which has the effect of drawing oil from the reservoir 20 through the lift tube 53 and into the funnel 52, from which it passes through the lower sleeve member 51 and into the oil passageway 50 formed in the venturi plug 40. As the oil is discharged into the expanding chamber 43 it impinges and admixes with the air issuing from the venturi throat 42, as a result of which a portion of the total quantity of oil entering the expanding or admixing chamber 43 is broken up into very minute particles to form an air-oil mist, the temperature of the oil as it admixes with the air being maintained above the aerolization point. The oil mist then flows past a series of angularly spaced radial bores 67 which communicate chamber 38 with the larger end of the admixing chamber 43 to subject the oil mist to secondary air jets, thus enhancing the breakup of the oil into more minute particles.

The oil mist then issues through a series of passages 68 formed in the lower end of the nipple 46 and into the oil reservoir 20, it being understood of course that the level of oil in the reservoir is maintained sufficiently below the top wall 59 so that the oil mist can flow thereabove from the outlet passages 68 to the oil mist outlet conduit 66. One or more baffles may be provided between the nipple 46 and the outlet conduit 66 for removing the larger particles of oil which, although carried by the oil mist, do not comprise part of the oil mist.

In prior art devices the various components of the oil mist generating head are made of metal such as brass 90–10 or the like and the oil lift tube is generally made of copper tubing. The thermal conductivity ("K" factor) of brass 90–10 is 63 B.t.u./hr./ft.$^2$/° F./ft. and the "K" factor of copper is 224. One facet of this invention resides in the discovery that the cooling effect of the oil mist passing across the exposed portion of the oil lift tube in the reservoir and the additional cooling effect of the expanding air in the venturi of the oil mist generating head is sufficient to substantially reduce the temperature of the oil as it is delivered to the generating head because of the high thermal conductivity of the materials of construction of which the generating head and the oil lift tube are made. Accordingly in prior devices either the oil in the reservoir is overheated substantially beyond the aerolization point or the incoming pressurized air heated substantially beyond ambient air temperature to compensate for the cooling effect of the expanding air on the oil mist and of the oil mist on the oil lift tube the effects of which were not heretofore fully appreciated.

In accordance with the principles of the present invention means are provided for insulating the stream of oil being delivered to the venturi plug to avoid any significant temperature drop of the oil as it is conveyed from the reservoir 20 to the venturi plug 40.

In the illustrated embodiment of the invention the oil lift tube 53 as well as the oil funnel 52 are constructed of plastic material having very low thermal conductivity properties and which serves as an exceptional insulator. A wide variety of plastics, such as nylon, fluorocarbon resin and chlorinated polyether may be utilized and it will be appreciated, of course, that other material having high insulating characteristics may be used in addition to plastic.

The effect of utilizing materials having good thermal insulating properties may be illustrated by the following example. Assume that air at ambient temperatures is being directed through air inlet 32 to the venturi plug 40 at a pressure which is sufficient to drop the temperature of the air after is has expanded in the admixing chamber 43 to a level which is sufficiently reduced to lower the temperature of the oil mist to approximately 60° F. as it issues from the bores 68 into the upper portion of the oil reservoir 20 above the level of the oil therein. Further assume that the temperature of the oil in the reservoir 20 is maintained at 150° and that the length of the oil lift tube 53 between the level of oil in the reservoir and the underside of the reservoir top plate 59 is 6″. This 6″ of tube is subjected to a temperature of 60° since the 60° oil mist occupies the space between the top of the oil level and the top plate 59 as it flows to the oil mist outlet 66. Further assume that the O.D. and I.D. of the tube 53 are 0.250 inch and 0.186 inch, respectively.

In order to determine the temperature drop of the oil in this 6″ length of tube 53 consider the following applicable heat transfer equation:

$$q=\frac{\pi D_2+D_1 l(t_1-t_2)}{D_2-D_1}$$

Where:

$q$=heat transfer through tubing, B.t.u./hr.
$D_2$=outside diameter of tubing/ft.
$D_1$=inside diameter of tubing/ft.
$l$=length of tubing/ft.
$t_1$=inside surface temperature of tubing/° F.
$t_2$=outside surface temperature of tubing/° F.
$k$=thermal conductvity of tubing material, B.t.u./hr./ft.$^2$/° F./ft.

Thus, conduction through the 6″ of tubing 53 exposed to the 60° mist is determined as follows:

$$q=\frac{\frac{\pi(0.250+0.186)}{12}\frac{(6)}{12}(150-60)k}{\frac{(0.250-0.186)}{12}}$$

$q$=960 $k$.

Now, if the oil lift tube 53 is made of copper, having a thermal conductivity ($k$) of 224, $$q=960\ (224)=215{,}000\text{ B.t.u./hr.}$$

On the other hand, if the oil lift tube 53 is constructed of nylon, which has a thermal conductivity ($k$) of only 0.14, $$q=960\ (0.14)=135\text{ B.t.u./hr.}$$

Thus the heat transfer through the 6 inches of exposed oil lift tube 53 is hundreds of times less if the tube is made of nylon rather than copper.

This difference in conductivity has a significant effect on the temperature drop of the oil in the oil lift tube 53. For example, consider the following applicable equation for determining the temperature drop of the oil as it passes through this 6 inches of oil lift tube 53 which is exposed to 60° F. oil mist:

$$\Delta t=\frac{q}{WC}$$

Where:

$\Delta t$=temperature drop of oil as it passes through the exposed 6 inches of oil lift tube 53, ° F.
$q$=heat transfer through the exposed 6 inches of tubing, B.t.u./hr.
$w$=quantity of oil passing through tube, lbs./hr.
$c$=specific heat of oil.

Assume that the illustrated oil mist generating head 17 being used is capable of providing lubricant for about 1000 bearing-inches with 2000 S.U.S. at at 100° F. oil, or about 10 ounces of oil per hour to the bearings. Since about ten times more oil passes through the venturi plug 40 (and hence the oil lift tube 53) than passes out of the oil mist outlet 66 to the bearings (because of the condensing out of the heavy oil globules entrained in the mist) assume about 10×10 ounces per hour, or 100 ounces/hr. (8.92 lbs./hr.) passes through the oil lift tube 53. The specific heat of 2000 S.U.S. at 100° F. oil is about 0.50. Therefore, for 2000 S.U.S. oil, $$\Delta t=\frac{q}{(8.92)(0.50)}$$

Now, if $\Delta t_1$ equals the temperature drop of the oil through the 6 inches of exposed tubing where the tubing is made of copper, then $$\Delta t=\frac{215{,}000}{(8.92)(0.50)}=48{,}000°\text{ F.}$$

Since this theoretical temperature drop cannot be achieved, the temperature of the oil as it leaves that portion of the oil lift tube 53 exposed to the 60° F. oil mist will be reduced to 60° F., or the same temperature as that of the oil mist surrounding the outer surface of the oil lift tube 53. On the other hand, if $\Delta t_2$ equals the temperature drop of the oil where the oil lift tube 53 is made of nylon, then $$\Delta t_2 = \frac{135}{(8.92)(0.50)} = 30° \text{ F.}$$

Thus, where the oil lift tube is made of copper, the oil, as it leaves the exposed portion of the tube 53 and enters the mist generating head 17, is at a temperature of 60°. However, where the oil lift tube is made of nylon, the temperature of the oil as it enters the mist generating head 17 is (150°−30°)=120°.

Now 60° F. is below the aerolization point of 2000 S.U.S. oil and hence the oil must be reheated after it enters the mist generating head 17 if suitable oil mist generating conditions are to be met. However, 120° F. is well above the aerolization point, and thus where a nylon oil lift tube is used re-heating of the oil in the mist generating head is not required.

The advantages in utilizing material having low thermal conductivity for the oil lift tube 53 are also inherent in the case of the oil funnel 52. For example, assume that the funnel 52 is made of aluminum (where "$k$"=118) or of brass 90–10 (where "$k$"=63). The loss of heat through the funnel 52 as a result of the cooling effect of the expanding air in the mist generating head 17 will be approximately 840 times greater for aluminum than for nylon, and approximately 450 times greater for brass 90–10 than for nylon.

Other plastic materials such as fluorocarbon resin ("$k$"=0.14) and chlorinated polyether ("$k$"=0.08) have extremely good thermal insulation characteristics for reducing temperature drop of the oil from the oil reservoir 20 to the admixing chamber 43.

In further accordance with the principles of the present invention, the pressurized air being supplied to the oil mist generating head 17 may be maintained at a constant temperature, since constant air temperature assures constancy in the quantity or flow rate of oil mist being generated by the generating head 17 for a given oil viscosity and air pressure.

A preferred manner of maintaining the temperature of incoming air at a constant level is to adjust the air heater thermostat 18 to a temperature slightly above the maximum anticipated ambient air temperature. For example, assume that the generator 10 is installed in a steel rolling or metal fabrication plant wherein ambient air temperature is likely to periodically rise as high as 110° F. The thermostat 18 may be adjusted to a temperature of about 120°, thereby assuring that variations in ambient air temperature will leave no effect on the temperature or density of the air entering the oil mist generating head 17, and thus will leave no effect on the generating capacity of the oil mist generating head 17 for a given viscosity of oil and given air pressure. It will be appreciated, of course, that in accordance with the principles of the present invention the temperature of the air as it enters the oil mist generating head 17 may be substantially less than the temperature of the oil in the reservoir 20.

Although minor modifications might be suggested by those versed in the art, it should be understood that we wish to embody within the scope of the patent warranted hereon all such modifications as reasonably come within the scope of our contribution to the art.

The invention claimed is:

1. A method of generating an aerosol or oil mist with lubricating oil comprising the steps of:
    directing a stream of pressurized air to the throat of the venturi of an oil mist generating head, heating a reservoir of lubricating oil to a temperature between the aerolization and chemical decomposition points of the oil,
    communicating the lubricating oil in the reservoir with the throat of the venturi to draw a stream of oil from the reservoir into admixing relation with the air within an admixing chamber in the venturi to produce the aerosol, and
    insulating the stream of lubricating oil so that the temperature of the oil is maintained above the aerolization point as it admixes with the air.

2. The method as defined in claim 1 wherein the temperature of the air stream as it enters the oil mist generating head is below the temperature of the oil in the reservoir.

3. The method as defined in claim 1 wherein the temperature of the air in the air stream is maintained at a substantially constant value.

4. The method as defined in claim 1 wherein the air in the air stream is heated to a constant temperature slightly above ambient air temperature.

5. The method as defined in claim 1 wherein the temperature of the air in the air stream is maintained at about 120° and wherein the oil in the reservoir is heated to a temperature of about 140° and higher.

6. The method as defined in claim 1 wherein the oil stream is insulated sufficiently so that the temperature of the oil is greater than the temperature of the air as the oil and air enter the admixing chamber.

7. In an oil mist lubricating system,
    an oil mist generating head including a venturi having an air-oil admixing chamber,
    means formed in said generating head for directing a stream of pressurized air to said admixing chamber,
    an oil reservoir,
    heating means for maintaining the temperature of the oil in the reservoir between the aerolization and chemical decomposition points thereof, and
    conduit means including means formed in said generating head for directing a stream of oil from said reservoir to said admixing chamber,
        said conduit means including insulation means for maintaining the temperature of the oil as it is conveyed to the admixing chamber above the aerolization point thereof for mixing with the air stream to provide an oil mist.

8. The apparatus as defined in claim 7 and including:
    means for maintaining the temperature of the air stream at a substantially constant level below the temperature of the oil stream.

9. The apparatus as defined in claim 7 wherein said conduit means comprises an oil lift tube extending from a point in the oil reservoir below the level of the oil to the generating head,
    said oil lift tube being constructed of material having insulation properties sufficient to prevent any substantial reduction in the temperature of the oil stream due to the cooling effect of the oil mist on the oil lift tube in the reservoir above the level of the oil therein.

10. The apparatus as defined in claim 7 wherein said generating head is made of a first material and said insulation means is made of a second material, the ratio of the thermal conductivities of said first and second materials being within a range of about 450:1 to 1600:1.

11. For use in a centralized oil lubricating system, an oil mist generating head comprising:
    a metal body member,
    means in said body member forming a venturi including a frusto-conical air-oil admixing chamber,
    a pressurized air inlet and a high-velocity throat communicating said air inlet and the small end of the admixing chamber,
    means in said body member forming a generally vertically extending oil passageway above said venturi for directing oil downwardly into the small end of the admixing chamber and including a downwardly converging open-ended funnel member,
    means forming a bore in said body member extending therethrough to the exterior thereof,
    means including an oil lift tube extending through said bore and terminating interiorly of said body member at a point above said funnel member for directing oil into the top end of said funnel member,
said oil lift tube and said funnel member being constructed of non-metallic insulation material.

12. The generating head as defined in claim 11 wherein said oil lift tube and said funnel member are constructed of plastic.

13. The generating head as defined in claim 11 wherein the thermal conductivity ($k$) of the material of which said oil lift tube and said funnel member are constructed is no greater than 0.14 B.t.u./h./ft.$^2$/° F./ft.

14. The generating head as defined in claim 11 wherein said oil lift tube and said funnel member are constructed of nylon.

15. The generating head as defined in claim 11 wherein said oil lift tube and said funnel member are constructed of fluorcarbon resin.

16. The generating head as defined in claim 11 wherein said oil lift tube and said funnel member are constructed of chlorinated polyether.

References Cited

UNITED STATES PATENTS

| | | | |
|---|---|---|---|
| 2,719,604 | 10/1955 | Allen | 184—55 |
| 2,753,013 | 7/1956 | Tear | 184—55 |
| 2,890,765 | 6/1959 | Friedell | 184—55 |
| 2,944,029 | 7/1960 | Jones et al. | |
| 2,998,391 | 8/1961 | Jones et al. | |
| 3,009,826 | 11/1961 | Straughn et al. | |
| 3,191,718 | 6/1965 | Haywood | 184—1 |

FRED C. MATTERN, Jr., Primary Examiner

M. A. ANTONAKAS, Assistant Examiner

U.S. Cl. X.R.

184—1